Aug. 23, 1966   J. S. EPPS ETAL   3,267,739
ACCELEROMETER

Filed Nov. 8, 1963   3 Sheets-Sheet 1

Fig. I

John S. Epps
William A. Woodford INVENTORS

BY Robt Williams Jr.

ATTORNEY

Aug. 23, 1966    J. S. EPPS ETAL    3,267,739
ACCELEROMETER
Filed Nov 8, 1963    3 Sheets-Sheet 2

John S. Epps
William A. Woodford    INVENTORS

BY *Rolf Stulhaus Jr*

ATTORNEY

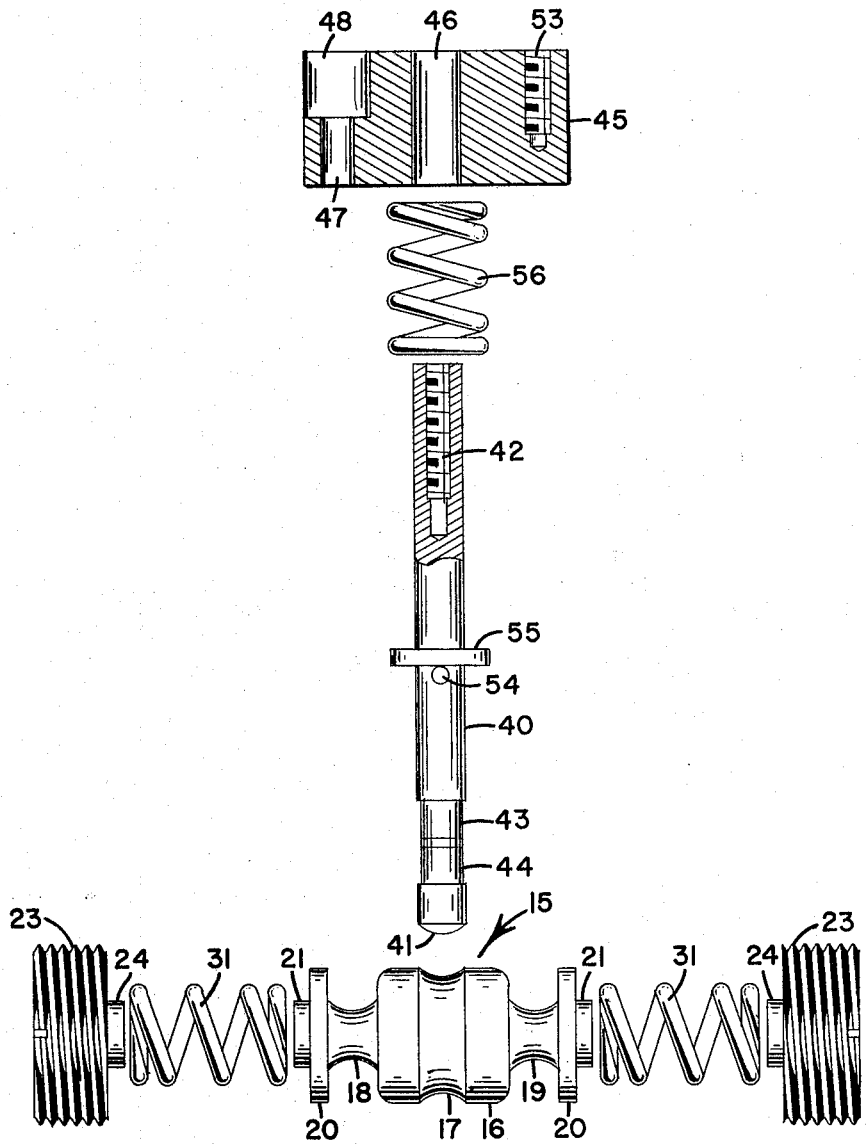

3,267,739
ACCELEROMETER
John S. Epps and William A. Woodford, Huntsville, Ala.,
assignors to Thiokol Chemical Corporation, Bristol, Pa.,
a corporation of Delaware
Filed Nov. 8, 1963, Ser. No. 322,431
6 Claims. (Cl. 73—492)

This invention relates to improvements in acceleration indicators and, more particularly, to indicators of this type that are to be used with solid propellant rocket motors to determine whether such rocket motors have received any shocks that might be detrimental to the burning rate and flight thereof.

The accelerometer embodying the invention was designed to indicate detrimental shocks of predetermined force that have been received by a rocket motor along the horizontal, transverse, and vertical axes thereof. Such an accelerometer had to be rugged enough to withstand the field handling of mobile propulsion systems, and the devices of this type available at the present time could not meet such a requirement. Since the missile forming the backbone of the mobile propulsion system would be subjected to rough handling and transportation, the accelerometer had to be dampened to eliminate any vibration caused by such transportation until such vibration reached or exceeded a force of 10G's on the rocket motor with which it is being used. If the accelerometer had not been dampened to this extent, forces less than 10G's coupled with a resonance frequency caused by the moving vehicle could readily cause the accelerometer to function and thus falsely represent the fact that the rocket motor had been damaged to a detrimental extent.

It is an object of this invention, therefore, to provide an accelerometer that will not function until a force of 10G's has been encountered.

Another object of this invention is to provide an accelerometer that is easy to reset, is small, rugged, and can be relied on to operate with a high degree of accuracy.

A further object of this invention is to provide an accelerometer having interchangeable parts and able to indicate shocks along the horizontal, transverse and vertical axes of a rocket motor.

With the above and other objects and advantages in view, the invention consists of the novel details of construction, arrangement and combination of parts more fully hereinafter described, claimed and illustrated in the accompanying drawings in which:

FIGURE 3 is an exploded pictorial view of the related components of the indicating members of FIGURE 2.

Figure 1:
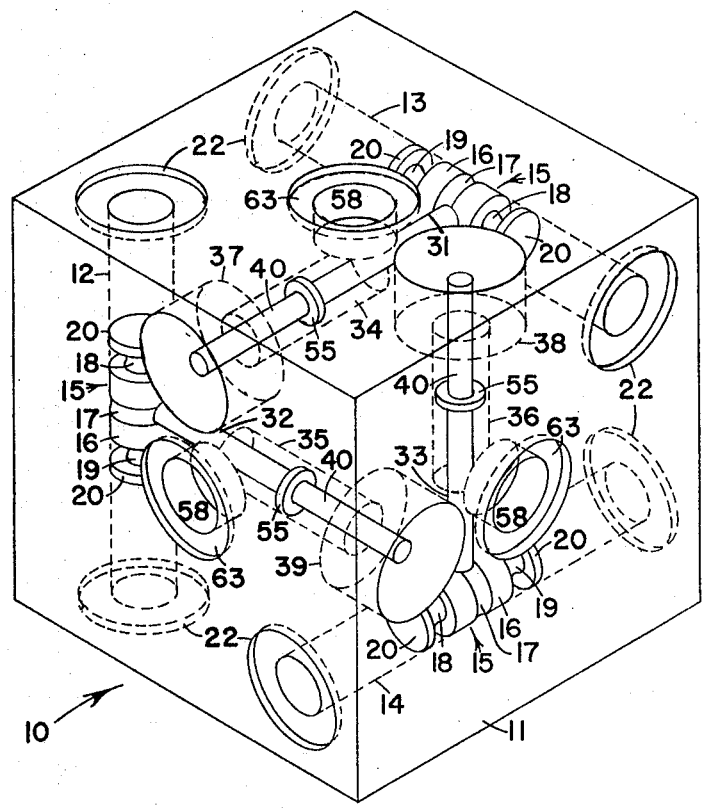
FIGURE 1 is a schematic perspective view of an accelerometer embodying the invention.

Referring more in detail to the drawings wherein like parts are designated by like reference numerals, the reference numeral 10 is used to generally designate an accelerometer embodying the invention.

The accelerometer 10 comprises a housing or body 11 which, as shown, is in the shape of a cube; but it is to be understood that such shape may be varied, if desired, to meet certain requirements that must be met in the mounting and efficient operation thereof. The material from which the housing or body 11 is made may be of any suitable characteristics that are desired in the construction thereof.

The housing or body 11 is provided with a plurality of pockets or bores 12, 13 and 14 respectively, each of which extends through a pair of opposed faces of the body or housing 11. Thus, as shown in FIGURE 1, it may be said that the pocket 12 extends in a vertical axis from the bottom to the top of the housing or body 11, the pocket 13 extends in a transverse axis from one face to another face of the housing or body 11 and the pocket 14 may be said to extend longitudinally of the housing or body 11 from one of the remaining faces to the other of the remaining faces. With the housing or body 11 being a cube, the pockets 12, 13 and 14 will always extend in axial relation to the faces of the housing or body 11, as shown, regardless of what face it rests on and even though the axial relation of the pockets 12, 13 and 14 will change in relation to a plane surface as the various faces of the housing or body 11 are placed thereon.

Mounted for reciprocal movement in each of the pockets 12, 13 or 14 is a cylindrical plunger or weight 15; and since each is of similar configurations in all respects, it is believed that the description of one will suffice for all three thereof.

Each of the plungers or weights 15 comprises a central portion 16 having an annular medial groove 17 therein and grooved extensions 18 and 19 extending outwardly of the central portion medially thereof and integrally therewith. The extensions 18 and 19 are of reduced dimensions as to the central portion 16; and each has a disc 20 integral with the free outer end thereof that is of equal diameter to the central portion 16. Each of the discs 20 has a stud 21 integral therewith, centrally thereof, and extending outwardly thereof in axial alignment with the extensions 18 and 19.

An internally threaded socket 22 is provided at each end of the pockets 12, 13 and 14 and an adjusting screw 23 is threadably mounted in each of the sockets 22. Each of the adjusting screws 23 has a stud 24 integral therewith and centrally thereof; and the studs 24 are in axial alignment with the studs 21 on the discs 20. The sockets 22 are covered by closure discs 25 and 26 respectively, which are retained in place by means of machine screws 27 and 28 that extend into threaded bores 29 and 30 in the housing or body 11 adjacent to the socket 22.

Extending between the discs 20 and the adjusting screws 23 in circumjacent relation to the studs 21 and 24 are tension springs 31, the tension of which is affected by the adjustment of the adjusting screws 23.

Positioned in the housing or body 11 so that they extend from the medial portion of each of the pockets 12, 13 and 14 at right angles thereto in perpendicular relation therewith are a plurality of bores 31, 32 and 33 respectively. Communicating with the inner ends of the bores 31, 32 and 33 and in axial alignment therewith are a plurality of circular cavities 34, 35 and 36 respectively. There are also a plurality of circular recesses 37, 38 and 39 positioned in their related faces of the housing or body 11; and the recesses 37, 38 and 39 are in axial alignment with their respective bores and cavities so that there is direct communication between the related faces of the housing or body 11 and their respective pockets.

Positioned in each of the bores 31, 32 and 33 and extending through the cavities 34, 35 and 36 to terminate within the recesses 37, 38 and 39 is a dampening and indicating rod 40. The inner end of each of the rods 40 is rounded as at 41 and is adapted to coact with the groove 17 in the plungers or weights 15, as well as the grooved extensions 18 and 19, as will be later described; and the outer end of each of the rods 40 is provided with an internally threaded bore 42. That portion of the rods 40 that is located within the bores 31, 32 and 33 is provided with a pair of sight gauges or bands 43 and 44; and one gauge may be green for "go" and the other gauge may be red for "no go."

A plug 45 is positioned within each of the recesses 37, 38 and 39 so that the outer surface thereof is within the outer surface of the face of the housing or body 11; and each of the plugs 45 is provided with a bore 46 that is in axial alignment with the bores 31, 32 and 33 and cavities 34, 35 and 36. The outer ends of the rods 40 all terminate within their respective bores 46 and access from the exterior face of the housing or body 11 may be gained to the bore 42 of each of the rods 40 for a purpose to be later described.

Each of the plugs 45 is also provided with a bore 47 and a communicating socket 48 so that a machine screw 49 extending through the bore 47 and socket 48 can be threaded into an internally threaded bore 50 that is positioned in the housing or body 11 adjacent to and parallel with its related cavities 34, 35 and 36. A closure disc 51 is positioned in each of the recesses 37, 38 and 39 over the plugs 45, and a machine screw 52 extended through each of the discs 51 into a threaded bore 53 in each of the plugs 45 retains the discs 51 in their respective recess 37, 38 and 39.

A pin 54 extends transversely through each of the rods 40 to act as a rest or stop for a washer 55 that is positioned on the rod 40 in circumjacent relation thereto, and a tension spring 56 positioned on the rod 40 also in circumjacent relation thereto abuts at one end thereof the plug 46 and at the opposite end thereof abuts the washer 55.

A plurality of truncated, conical-shaped sight openings 57 are positioned in the housing or body 11; and there is a sight opening 57 provided for each of the bores 31, 32 and 33. The openings 57 extend at right angles from and communicate with the bores 31, 32 and 33 and permit an observer to check the "go" and "no go" indicators 43 and 44. Contiguous with the sight opening 57 and located in the respective face of the housing or body 11 is a circular recess 58 in which is mounted by means of O-rings 59 and 60 a magnitfying or sight glass 61. A closure ring 62 mounted in a circular recess 63 that is contiguous with the recess 58 retains the sight glass 61 in the recess 58 and a machine screw 64 extending through the closure ring 62 into a threaded bore 65 in the housing or body 11 retains the closure ring 62 in position in the recess 63.

The accelerometer 10 embodying the invention is able to measure shock in two directions in three different planes; therefore, when the housing or body 11 is mounted on the casing or nozzle of a solid propellant rocket motor, it can indicate what shock forces have been received by the solid propellant rocket motor during the handling and transportation thereof.

The dampening rod 40 performs a dual function in that, under the influence of the spring 56, the rounded end 41 thereof will be seated in the groove 17 in the plunger or weight 15 to prevent any vibration thereof which will be caused by the normal movement of the vehicle. However, should a detrimental shock force be applied in either direction to the plunger or weight 15, the spring 56 which is tensioned to withstand shock forces of approximately 8 or 9G's will be overcome to permit the rounded end 41 of the dampening rod 40 to be unseated from the groove 17; but since the springs 31 are adjusted by means of the adjusting screws 23 to only allow further movement of the plunger or weight 15 when a shock force of 10G's has acted thereon, the end 41 of the dampening rod 40 will not drop into either of the grooves 18 or 19 until a shock force of 10G's is present. Then by means of the "go" and "no go" indicators, the dampening rod 40 will notify an observer of the condition of the solid propellant rocket motor.

Figure 2:
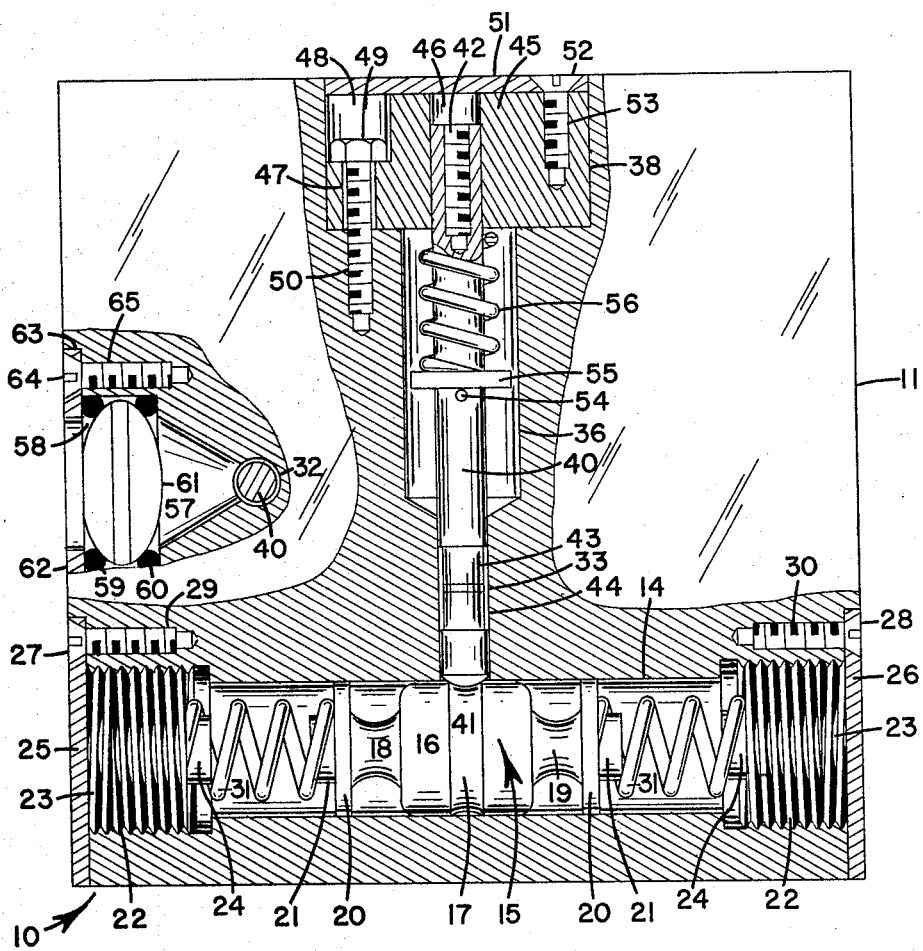
FIGURE 2 is an elevational view of one face of the accelerometer of FIGURE 1, partly broken away and partly in section, to show one of the indicating members thereof.

In the position of the rod 40 in FIGURE 2, the "go" indicator is in view through the sight glass 61; but should the plungers or weights 15 be moved in either direction by a shock force of 10G's, the rod 40 will be moved out of the groove 17 and will come to rest in either of the grooved extensions 18 or 19 depending from which direction the force has ben applied to the plunger or weight 15.

The "go" indicator in view at all times will advise an observer that no detrimental shocks have been felt by the solid propellant rocket motor and it is in condition to be fired. Should the plunger or weight 15 be shifted under shock force, it will not move again until the accelerometer 10 has been reset. The resetting of the accelerometer is accomplished by removing the closure plate 51 and inserting a threaded rod into the threaded bore 42 of the rod 40 and pulling the rod 40 out of either the groove 18 or 19 which ever it is in to permit the springs 31 to move the plunger or weight 15 back into its neutral position so that, when the rod 40 is permitted to return to its normal position, the rounded end 41 thereof will again engage the groove 17 in the plunger or weight 15.

Since it is very important that the solid propellant rocket motor is in condition to be fired, the use of the accelerometer 10 will not only prevent a misfire of the solid propellant rocket motor; but it will also indicate whether the flight of the solid propellant rocket motor will be successful.

The accelerometer 10 embodying the invention, therefore, becomes an important adjunct to a solid propellant rocket motor during the handling and transportation thereof.

It is believed that the structure and manner of use of the accelerometer will be apparent from the foregoing description to those skilled in the art; and it is to be understood that variations and changes may be made to the construction and arrangement of the parts thereof provided such variations and changes fall within the spirit of the invention and the scope of the appended claims.

Having thus described the invention, what is claimed as new and desired to be secured by Letters Patent is:

1. An accelerometer for use with a solid propellant rocket motor comprising a housing, a plurality of members mounted for reciprocal movement in said housing, said members being responsive to acceleration in two directions along the vertical, longitudinal, and transverse axes of said rocket motor, indicating rods coacting with said members to indicate the directional and axial movement thereof, and each of said indicating rods having an internally threaded bore in the outer end thereof to receive means for retracting each of said indicating rods to reset said accelerometer.

2. An accelerometer, as in claim 1, wherein pockets are provided in said housing for mounting said members therein and tension springs are mounted in said pockets on opposite ends of said members, said tension springs being able to be adjusted to allow movement of said members when a predetermined force of acceleration has been applied to said members.

3. An accelerometer, as in claim 1, wherein said indicating rods are forced into contact with said members to prevent vibration of said members or accidental movement thereof until a predetermined force of acceleration has been applied to said members.

4. An accelerometer, as in claim 1, wherein bores are provided in said housing to receive said indicating rods and sight openings are provided in said housing to observe said rods to determine the indicating status of said rods.

5. An accelerometer for use with a solid propellant rocket motor comprising a housing, a purality of acceleration responsive members mounted in said housing, a plurality of dampening members extending at right angles to and engaging said first said members to prevent movement of said first said members until an acceleration of predetermined force has been applied to said first said members, indicating means on said dampening members, a plurality of sight glasses arranged in said housing for coaction with said indicating means for the observance thereof, and each of said dampening members having an internally threaded bore in the outer end thereof to receive an externally threaded rod for retracting each of said dampening rods to reset said accelerometer.

6. An accelerometer for use with a solid propellant rocket motor comprising a housing having a plurality of pockets positioned therein, a plurality of members mounted for reciprocal movement in the pockets in said housing, tension springs mounted in said pockets on opposite ends of said members, means engaging said springs to adjust the tension thereof to permit movement of said members when a pre-determined force of acceleration has been applied to said members, said members being responsive to a force of acceleration in two directions along the vertical, longitudinal and transverse axis of said rocket motor, said housing having bores therein extending at right angles to said pockets and the members therein, indicating rods in each of said bores coacting with their related members to indicate the directional and axial movements of said members, springs mounted on said indicating rods for biasing said rods into contact with said members to prevent vibration of said members and accidental movement thereof until the pre-determined force of acceleration has been applied to said members, said housing having sight openings therein communicating with said bores to observe said rods to determine the indicating status of said rods and each of said rods having an internally threaded bore in the outer end thereof to receive the externally threaded end of a rod for retracting each of said rods to reset said accelerometer.

References Cited by the Examiner

UNITED STATES PATENTS

| | | | |
|---|---|---|---|
| 2,573,199 | 10/1951 | Holman | 200—61.53 |
| 2,825,297 | 3/1958 | Harrison | 116—114.29 |
| 3,020,874 | 2/1962 | Bruce et al. | |
| 3,117,196 | 1/1964 | Vincent | 200—61.53 X |
| 3,117,455 | 1/1964 | Shepherd | 73—492 |
| 3,149,606 | 9/1964 | Falkner | 73—492 X |

FOREIGN PATENTS 649,415  1/1951  Great Britain.

RICHARD C. QUEISSER, *Primary Examiner.*

J. J. GILL, *Assistant Examiner.*